J. J. EATON & A. V. FREE.
SCORE CARD FOR GOLF.
APPLICATION FILED JULY 27, 1914.
1,224,452.
Patented May 1, 1917.
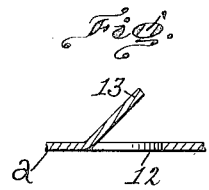

UNITED STATES PATENT OFFICE.

JOSEPH J. EATON AND ALBERT V. FREE, OF YONKERS, NEW YORK.

SCORE-CARD FOR GOLF.

1,224,452.                    Specification of Letters Patent.       Patented May 1, 1917.

Application filed July 27, 1914. Serial No. 853,568.

*To all whom it may concern:*

Be it known that we, JOSEPH J. EATON and ALBERT V. FREE, citizens of the United States, residing in Yonkers, in the county of Westchester and State of New York have invented an Improvement in Score-Cards for Golf, of which the following description, in connection with the accompanying drawings, is a specification, like characters on the drawings representing like parts.

This invention relates to a score sheet or card for the game of golf. The invention has for its object to provide a score card or sheet with which the player can keep a record of the game without the use of a pencil, and which record when once made cannot be altered except by making a new record.

To this end, the card or sheet is provided with a series of numbers for each hole in the game of golf, and these numbers are arranged in sequence from 1 to 10 or any other desired number, and each number is preferably inclosed by a boundary which forms a section of the card or sheet and may be partially severed from the sheet or card or may be perforated, so as to be readily removable from the card or sheet and leave an opening therein, which latter represents the number of strokes required to play a given hole.

Provision is also made for registering the total number of strokes required to complete the course. These and other features of this invention will be pointed out in the claim at the end of this specification.

Figure 1 is a plan view of a golf score card embodying this invention, and

Fig. 2, a detail in section to be referred to.

Referring to the drawing, *a*, *b* represent two score cards printed upon a single sheet or card, which is capable of being folded along the line *c*. Each of the cards *a*, *b*, is provided with numbers indicative of the holes on the course, and in the present instance each card is provided with the numbers 1 to 18, which are arranged in a vertical column at the left hand side of the card. The numbers indicative of the holes may and preferably will be separated by lines 10, which extend transversely of the card and form transverse spaces or rows, in each of which is printed a series of numbers, which in the present instance run from 1 to 10 and indicate strokes. Each of the stroke numbers in each horizontal row may be inclosed within a boundary, herein shown as a circle 12, and said circles form sections 13 of the card, which are capable of being removed by the player.

On the card *a*, the numbered sections 13 are represented as partially severed from the card proper, and capable of being pressed by the finger of the player out of the plane of the card and into an inclined position, as represented in Fig. 2, so that the section 13 can be taken hold of by the player and torn from the card.

On the card *b*, the numbered sections 13 are represented as perforated, so that they may be easily pushed out of the card. Between the numbers indicative of the holes and the serial numbers indicative of strokes, a space 14 is left in which may be printed numbers indicative of the length of the hole.

The numbers indicative of strokes are and may be arranged in vertical columns, and above the horizontal row of stroke numbers for the first hole, a space or margin 15 is provided for the name of the course and for the name of the player and the date on which the card is used.

Below the horizontal row of stroke numbers for the last hole, a space or margin 16 is left on which is printed numbers arranged in columns and indicative of hundreds, tens and units. In the present instance the hundreds column is provided with a single numeral, to wit 1. The tens column with numerals from 0 to 9 and the units column with numerals from 0 to 9. The numerals in these columns may be inclosed in a border, shown as square 17, and they may be made removable as above indicated, so that a record may be obtained of the total score. The space 16 at the bottom of the card may also be provided with any suitable words pertinent to the game and such as herein shown. A graphic illustration of the par or bogie of the course may be obtained by connecting the numbers indicating the par or bogie of the holes by lines 18, as represented on card *a*.

In operation, the player removes from the first row the number corresponding to the strokes required to play the No. 1 hole, which for illustration may be supposed to be five. In a like manner he removes from the remaining horizontal rows, the numbers corresponding to the number of strokes required to play each of the remaining holes, and at the end of the game, he removes from the total columns the numbers corresponding to his total score. In this manner the score card is provided with a permanent record and the scoring is effected without the necessity of carrying a pencil.

The invention is shown as embodied in a card, but it is not desired to limit the invention in this respect, as the invention may be embodied in a sheet and a plurality of the sheets may be assembled in the form of a book.

Claim:

A score sheet or card for golf, consisting of a sheet or card having printed thereon within the edges of the sheet or card a plurality of rows of numbers indicative of strokes with corresponding numbers in the various rows arranged in columns, and having means bounding the individual numbers and for enabling the portion of the card associated with the individual numbers in each to be removed therefrom, the bounding means for the numbers in each column being spaced apart from the bounding means in adjacent columns.

In testimony whereof, we have signed our names to this specification in the presence of two subscribing witnesses.

JOSEPH J. EATON.
ALBERT V. FREE.

Witnesses:
H. C. WORMS,
THOMAS HILTON.